(12) United States Patent
Choi et al.

(10) Patent No.: US 10,481,934 B2
(45) Date of Patent: Nov. 19, 2019

(54) VIRTUALIZED PERFORMANCE PROFILING AND MONITORING

(71) Applicant: Samsung Electronics Co., Ltd., Suwon-si, Gyeonggi-do (KR)

(72) Inventors: Inseok Stephen Choi, Redwood City, CA (US); Yang Seok Ki, Palo Alto, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 381 days.

(21) Appl. No.: 15/063,499

(22) Filed: Mar. 7, 2016

(65) Prior Publication Data

US 2017/0147379 A1 May 25, 2017

Related U.S. Application Data

(60) Provisional application No. 62/258,411, filed on Nov. 20, 2015.

(51) Int. Cl.
| | |
|---|---|
| *G06F 9/455* | (2018.01) |
| *G06F 13/10* | (2006.01) |
| *G06F 13/24* | (2006.01) |
| *G06F 13/28* | (2006.01) |
| *G06F 13/40* | (2006.01) |

(52) U.S. Cl.
CPC ........ *G06F 9/45558* (2013.01); *G06F 13/102* (2013.01); *G06F 13/24* (2013.01); *G06F 13/28* (2013.01); *G06F 13/4068* (2013.01); *G06F 2009/45583* (2013.01); *G06F 2009/45591* (2013.01)

(58) Field of Classification Search
CPC ........................................... G06F 9/455
See application file for complete search history.

(56) References Cited

U.S. PATENT DOCUMENTS

| | | | |
|---|---|---|---|
| 6,895,088 B1* | 5/2005 | Nelson ............... | H04M 3/2254 379/219 |
| 8,209,681 B1 | 6/2012 | Turner et al. | |
| 8,935,463 B1 | 1/2015 | Aswadhati et al. | |
| 8,935,771 B2* | 1/2015 | Sotoodeh ............... | G06F 21/79 713/189 |
| 2005/0144186 A1* | 6/2005 | Hesselink ............... | H04L 67/06 |
| 2009/0080332 A1* | 3/2009 | Mizrachi .................. | H04L 47/10 370/236 |
| 2009/0222549 A1* | 9/2009 | Gilbert ................ | G06F 11/3409 709/224 |
| 2012/0311475 A1* | 12/2012 | Wong .................. | G06F 11/3003 715/772 |
| 2015/0205691 A1 | 7/2015 | Seto | |

* cited by examiner

*Primary Examiner* — Bing Zhao
(74) *Attorney, Agent, or Firm* — Renaissance IP Law Group LLP

(57) ABSTRACT

An embodiment includes a system, comprising: a communication interface configured to communicate with a remote system external to the system; a memory; and a processor coupled to the communication interface and the memory and configured to: receive performance data from the remote system through the communication interface; maintain a virtual performance register in response to the performance data; receive a performance register access associated with the remote system through the communication interface; and respond to the performance data access through the communication interface based on the virtual performance register.

15 Claims, 10 Drawing Sheets

VIRTUALIZED PERFORMANCE PROFILING AND MONITORING

CROSS-REFERENCE TO RELATED APPLICATIONS

This application claims the benefit of U.S. Provisional Patent Application No. 62/258,411, filed Nov. 20, 2015, the contents of which is hereby incorporated by reference herein, in its entirety, for all purposes.

BACKGROUND

This disclosure relates to virtualized performance profiling and monitoring and, in particular, virtualized performance profiling and monitoring using storage devices.

Processors such as general purpose processors may have hardware registers for monitoring various events related to the operation of the processor. Operating systems running on such processors may use software to expand upon hardware limitations of the registers and virtualize the registers for multiple virtual machines or instances. Such software may operate in kernel space, using memory and other resources.

SUMMARY

An embodiment includes a system, comprising: a communication interface configured to communicate with a remote system external to the system; a memory; and a processor coupled to the communication interface and the memory and configured to: receive performance data from the remote system through the communication interface; maintain a virtual performance register in response to the performance data; receive a performance register access associated with the remote system through the communication interface; and respond to the performance data access through the communication interface based on the virtual performance register.

An embodiment includes a system, comprising: a register configured to count events associated with the system; a communication interface configured to communicate with a remote system external to the system; and a processor configured to: receive an interrupt associated with the register; read a value of the register; and transmit the value to the remote system through the communication interface.

An embodiment includes a method, comprising: receiving, by a processor of a system, performance counter through a communication interface of the system from a remote system external to the system; maintaining, by the processor, a virtual performance register in response to the performance data; receive, by the processor, a performance register access associated with the remote system through the communication interface; and respond, by the processor, to the performance register access through the communication interface based on the virtual performance register.

DETAILED DESCRIPTION

Figure 1:
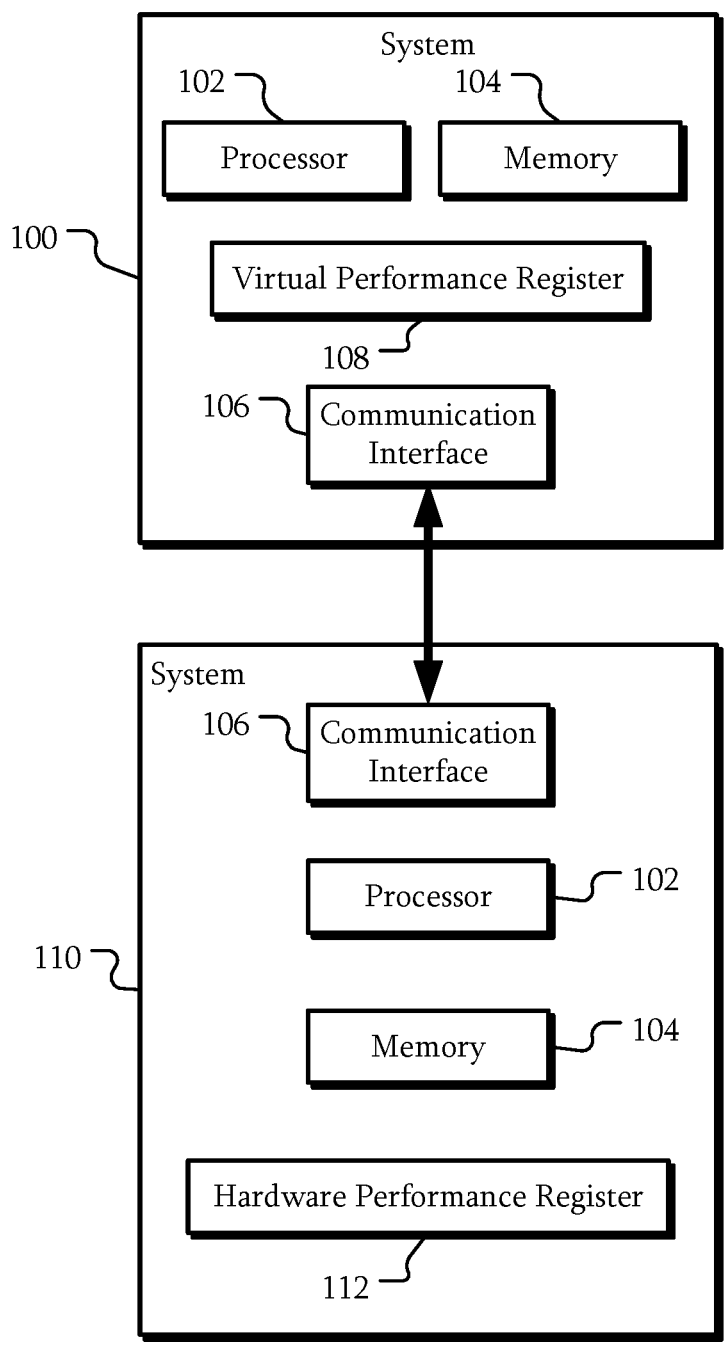
FIG. 1 is a schematic view of a system with a virtual performance register according to some embodiments.

The embodiments relate to virtualized performance profiling and monitoring. The following description is presented to enable one of ordinary skill in the art to make and use the embodiments and is provided in the context of a patent application and its requirements. Various modifications to the embodiments and the generic principles and features described herein will be readily apparent. The embodiments are mainly described in terms of particular methods and systems provided in particular implementations.

However, the methods and systems will operate effectively in other implementations. Phrases such as "an embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The embodiments will also be described in the context of particular methods having certain steps. However, the method and system may operate according to other methods having different and/or additional steps and steps in different orders that are not inconsistent with the embodiments. Thus, embodiments are not intended to be limited to the particular embodiments shown, but are to be accorded the widest scope consistent with the principles and features described herein.

The embodiments are described in the context of particular systems having certain components. One of ordinary skill in the art will readily recognize that embodiments are consistent with the use of systems having other and/or additional components and/or other features. However, one of ordinary skill in the art will readily recognize that the methods and systems are consistent with other structures. Methods and systems may also be described in the context of single elements. However, one of ordinary skill in the art will readily recognize that the methods and systems are consistent with the use of memory system architectures having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1 is a schematic view of a system with a virtual performance register according to some embodiments. In some embodiments, a system 100 is coupled to a system 110. The system 100 may be a remote system external to the system 110. Similarly, the system 110 may be a remote system external to the system 100. Each of the systems 100 and 110 may be referred to as a remote system depending upon the particular communication involved.

The system 100 includes a processor 102, a memory 104, and a communication interface 106. The system 110 similarly includes a processor 102, a memory 104, and a communication interface 106. However, the system 110 also includes a hardware performance register 112.

The processor 102 may be a general purpose processor, a digital signal processor (DSP), an application specific integrated circuit, a microcontroller, a programmable logic device, discrete circuits, a combination of such devices, or the like. The processor 102 may include internal portions, such as registers, cache memory, processing cores, or the like, and may also include external interfaces, such as address and data bus interfaces, interrupt interfaces, or the like. Although only one processor 102 is illustrated in systems 100 and 110, multiple processors 102 may be present. In addition, other interface devices, such as logic chipsets, hubs, memory controllers, communication interfaces, or the like may be part of the system 100 to connect the processor 102 to internal and external components.

As will be described in further detail below, in some embodiments, the system 110 may be a processor itself. The processor 102 of such a system 110 represents a processing core, control logic, internal state machines, or other circuitry within the system 110 that may execute instructions.

The memory 104 may be any device capable of storing data. Here, one memory 104 is illustrated for systems 100 and 110; however, any number of memories 104 may be included in the systems 100 and 110, including different types of memories. Examples of the memories 104 include a dynamic random access memory (DRAM) module, a double data rate synchronous dynamic random access memory (DDR SDRAM) according to various standards such as DDR, DDR2, DDR3, DDR4, static random access memory (SRAM), non-volatile memory such as Flash, spin-transfer torque magentoresistive random access memory (STT-MRAM), or Phase-Change RAM, magnetic or optical media, or the like.

The communication interface 106 may include circuitry that enables the systems 100 and 110 to communicate. In some embodiments, the communication interface 106 may be a mass storage device interface; however, the types of communication interfaces 106 are not limited to mass storage application. For example the communication interface 106 may include serial attached SCSI (SAS), serial ATA (SATA), NVM Express (NVMe), Fiber channel, Ethernet, remote direct memory access (RDMA), Infiniband, or other interfaces. With such communication interfaces 106, the systems 100 and 110 may be configured to communicate through the associated medium.

As described above, the system 110 includes a hardware performance register 112. The hardware performance register 112 may be a counter, storage, state machine, or other circuit in which performance data regarding system 110 operations may be accumulated and/or stored. For example, processors may include hardware performance registers 112 configured to measure system activities. If the system 110 is such a processor, the hardware performance register 112 may include a register configured to count a number of instructions per cycle, a frequency of operation, cache attributes such as L1, L2, or L3 cache/TLB hits/misses, memory stalls, transactions, or the like. Other examples include a register to count memory related statistics such a memory local/remote reads/writes, bandwidth, or the like. Still other examples include temperature and power measurements of a processor, memory devices, or the like. As will be described in further detail below, the system 110 may be a general purpose processor, such as an Intel, AMD, and ARM processors, general purpose graphics processing units, or the like. Accordingly, the hardware performance register 112 may be any performance monitoring register of such processors.

In some embodiments, the hardware performance register 112 may be limited in size. For example, some hardware performance registers 112 may be implemented as counters having a limited number of bits. Accordingly, such a hardware performance register 112 may overflow if the number of events in the hardware performance register 112 exceeds its capacity. In such an example, an interrupt may be generated. However, interrupts generated by the hardware performance register 112 are not limited to those generated by overflows. For example, the hardware performance registers 112 may be configured to generate an interrupt if the value stored in the hardware performance register 112 is above, below, or equal to a threshold, range, or the like.

The system 100 is configured to maintain a virtual performance register 108. In particular, the virtual performance register 108 presents a virtual implementation associated with the hardware performance register 112 in the system 110. The virtual performance register 108 may be a circuit similar to the hardware performance register 112; however, in some embodiments, the virtual performance register 108 may be implemented in the memory 104 of the system 100 and accessible through communication with the processor 102.

The processor 102 of the system 100 may be configured to receive performance data from the remote system 110 through the communication interface 106. For example, as will be described in further detail below, the processor 102 of the system 110 may read a value from the hardware performance register 112. The processor 102 may then transmit that value or a value derived from that value to the system 100 using the communication interface 106. The processor 102 of the system 100 is configured to maintain a virtual performance register 108 in response to the performance data. For example, the processor 102 may add the received performance data to a value stored in the memory 104 corresponding to the performance data. In a particular example, the virtual performance register 108 may be configured to periodically accumulate the performance data from the hardware performance register 112 after the hardware performance register 112 has overflowed. In other examples, any processing that the system 110 may otherwise have performed using the performance data from the hardware performance register 112 may be performed by the processor 102 of the system 100.

In some embodiments, the system 110 is configured to offload processing associated with the hardware performance register 112 to the system 100. For example, additional processing related to handling overflows, handling changes in state due to context switches, or the like may be performed by the system 100. As a result, the system 110 and, in particular, usage of the processor 102 and memory 104 of the system 110 may be reduced, freeing processor 102 time and memory 104 for other uses.

In particular, such profiling or monitoring performance through use of the hardware performance register 112 may introduce significant overhead in performance because reading performance data may be performed using system interventions such as OS interrupt/trap, binary translation, or other types of mechanisms to capture the status of the system 110. In addition, memory 104 must be allocated to maintain the performance data, specifically when the hardware performance register 112 overflows. Such usage may be exacerbated if the hardware performance register 112 is virtualized and memory must be allocated to maintain a virtual performance register in the system 110 for each thread, instance, virtual machine, or the like. As the system 100 is maintaining the virtual performance register 108, the system 110 need not allocate as many resources to profiling or performance monitoring.

In some embodiments, users may access the performance data through the communication interfaces 106. In particular, in the system 100, the processor 102 may be configured to receive a performance register access associated with the system 110 through the communication interface 106. The performance register access may be a request for data such as a value of a virtual performance register 108. In another example, the access may include configuration information for collecting performance data such as what events are counted, a state of the hardware performance register 112 to be restored, or the like.

The processor 102 of the system 100 may be configured to respond to the performance data access through the communication interface 106 based on the virtual performance register 108. In some instances the response may be transmitted to the system 110. The response may be data that was requested by the system 110. That is, instead of accessing the hardware performance register 112 for the processed data, the system 100 is accessed to provide the performance data to the system 110. Alternatively, other systems (not illustrated) may access the performance data and the response may be directed towards those systems.

Figure 2:
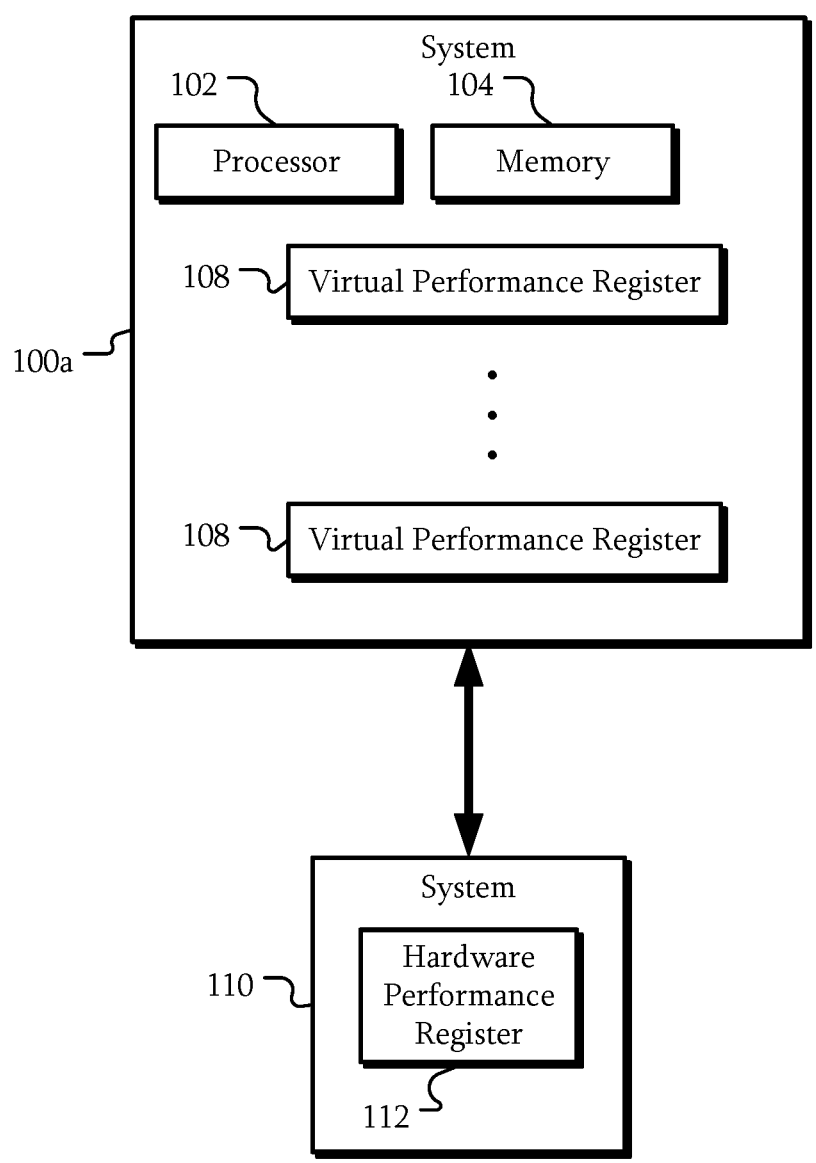
FIG. 2 is a schematic view of a system with virtual performance registers according to some embodiments.

FIG. 2 is a schematic view of a system with virtual performance registers according to some embodiments. In some embodiments, the systems 100a and 110 may be similar to the systems 100 and 110 of FIG. 1. However, in this embodiment, the system 100a is configured to maintain multiple virtual performance registers 108 based on performance data received from the hardware performance register 112 of the system 110. In addition, for clarity, some portions of the systems 100a and 110, such as the communication interface 106 and the processor 102 and memory 104 of the system 110 may not be illustrated, but may be present.

In some embodiments, the system 110 may be configured to maintain multiple virtual machines. Each virtual machine may be interested in performance data associated with that particular virtual machine. As will be described in further detail below, the system 100a may receive information related to context switches. Performance data collected related to each virtual machine may be used to maintain a different virtual performance register 108 so that the various virtual performance registers 108 may correspond to different instances, virtual machines, or the like.

In addition, the hardware performance register 112 may be configurable to record different events. In some embodiments, the hardware performance register 112 may be periodically reconfigured to monitor different events. For example, the hardware performance register 112 may be configured to alternate between monitoring cache misses during a first period and monitoring memory bandwidth during a second period. In some embodiments, the processor 102 of the system 100a may be configured to transmit configuration information to the processor 102 (not illustrated) of the system 110 to cause the processor 102 to change the configuration of the hardware performance register 112; however, in other embodiments, the change in configuration may occur in other ways.

Regardless of how changed, the performance data during the different periods may be transmitted to the system 100a. The processor 102 may be configured to update the appropriate virtual performance register 108. For example, for a given virtual performance register 108, the processor 102 may interpolate between performance data to generate performance data for the time period during which the hardware performance register 112 was monitoring for other events. In particular, this processing may be performed by the system 100a, reducing the requirements on the system 110.

Figure 3:
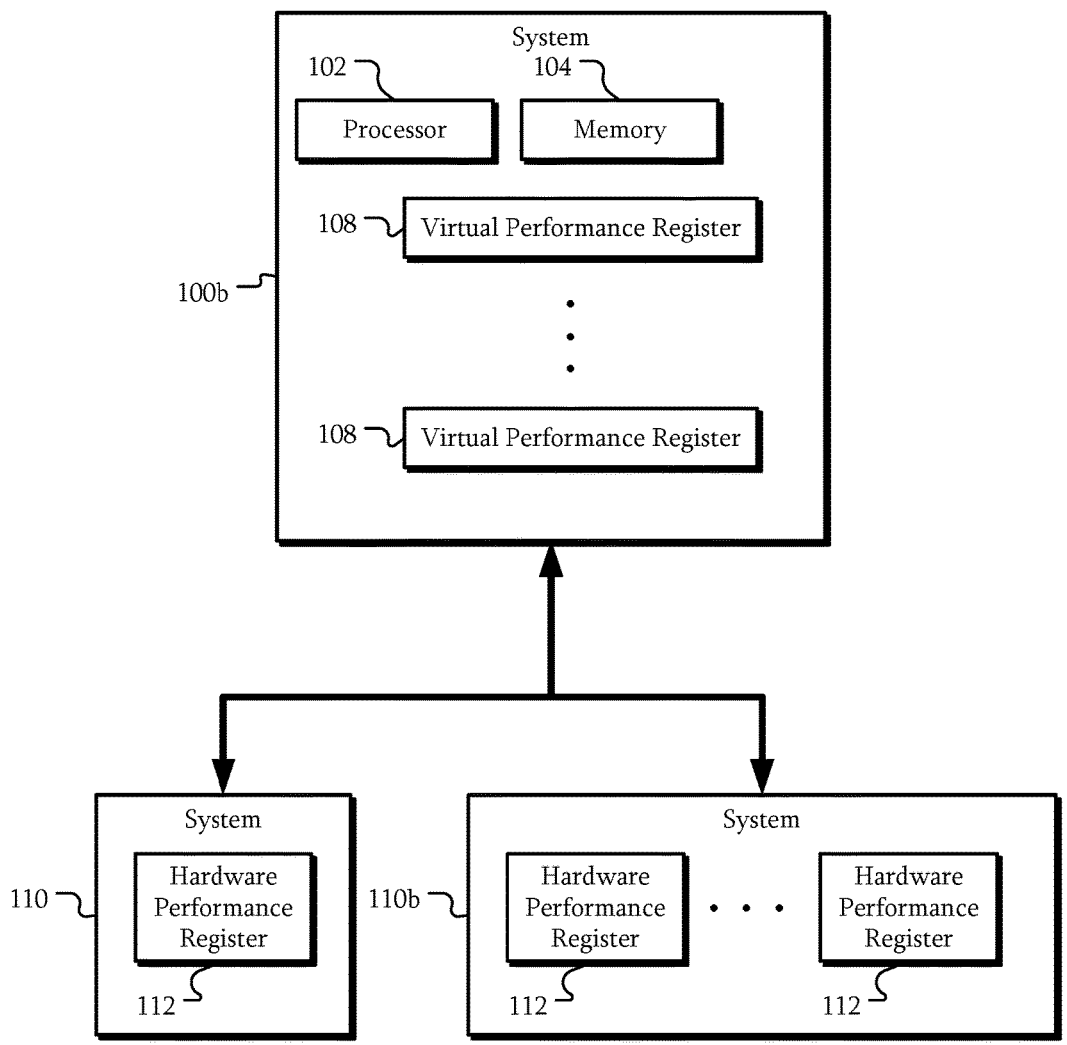
FIG. 3 is a schematic view of a system with virtual performance registers according to some other embodiments.

FIG. 3 is a schematic view of a system with virtual performance registers according to some other embodiments. In this embodiment, the systems 100b and 110 may be similar to the systems 100a and 110 of FIG. 2. However, in some embodiments, the system 100b is coupled to another system 110b. As with FIG. 2, some portions of the systems 110 and 110b may be omitted for clarity.

The system 110b may be similar to the system 110; however, the system 110b includes multiple hardware performance registers 112. Each of these hardware performance registers 112 may be configured to generate performance data that may be transmitted to the system 100b. As described above, the system 100b may be configured to maintain one or more virtual performance registers 108 in response to the performance data. In a particular example, the system 110b may be configured to maintain a virtual performance register 108 for multiple types of events for multiple virtual machines associated with the system 110b.

While some virtual performance registers 108 may be maintained in response to performance data received from the system 110b, other virtual performance registers 108 may be maintained in response to performance data from the hardware performance register 112 of system 110. That is, the virtual performance registers 108 may represent performance data for multiple systems such as systems 110 and 110*b*. While two systems 110 and 110*b* have been used as examples, any number of such systems may be present and configured to transmit performance data to the system 100*b*.

In a particular example, each of the systems 110 and 110*b* may be different, heterogeneous systems, such as different types of processors. In one example, the system 110 is a general purpose processor and the system 110*b* is a graphics processing unit. Each may have a different API to access the hardware performance registers 112. However, now that the performance data related to the hardware performance registers 112 is maintained in the system 100*b*, a unified interface may be presented to potential users, applications, or the like. That is, not only may the performance data be aggregated in one system 100*b*, the data may be presented in a unified manner, hiding the different implementations of performance monitoring on different systems from the user.

Figure 4:
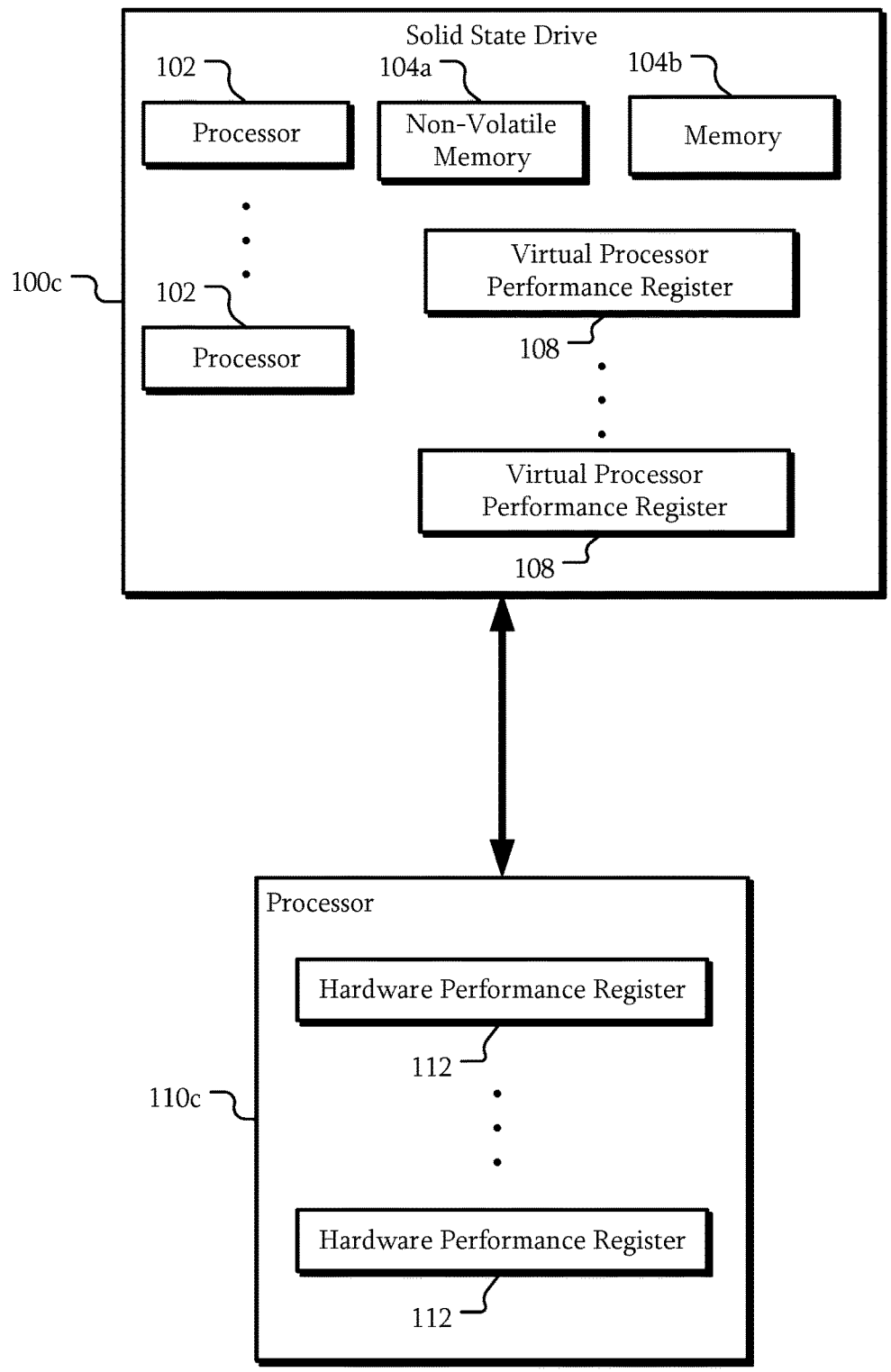
FIG. 4 is a schematic view of a solid state drive with virtual performance registers according to some embodiments.

FIG. 4 is a schematic view of a solid state drive with virtual performance registers according to some embodiments. In some embodiments, the solid state drive (SSD) 100*c* may be similar to the systems 100, 100*a*, and 100*b*, described above. In addition, the processor 110*c* may be similar to the systems 110, and 110*b* described above. Here, the SSD 100*c* includes multiple processors 102, non-volatile memory 104*a*, and additional memory 104*b*.

The non-volatile memory 104*a* may include memories such as such as Flash, spin-transfer torque magentoresistive random access memory (STT-MRAM), or Phase-Change RAM, or the like. The memory 104*b* may include similar or different types of non-volatile memory, or other types of memories such as a dynamic random access memory (DRAM) module, a double data rate synchronous dynamic random access memory (DDR SDRAM) according to various standards such as DDR, DDR2, DDR3, DDR4, static random access memory (SRAM), or the like.

The processor 110*c* may be configured to run an operating system. The operating system functions, system calls, or the like associated with the hardware performance registers 112 may degrade overall performance of the processor 110*c*. For example, system calls to read, manipulate, virtualize, or otherwise access the hardware performance registers 112 may contribute to degrading the performance. In a particular example, a kernel of the operating system may have code and data structures associated with accessing the hardware performance registers 112. These code and data structures may be relatively complicated and consume a relatively large amount of processing time. In addition, loading of the codes and data structures into cache memory may degrade performance of the cache with respect to other processes. In addition, the amount of memory available to kernel processes may be limited. Accordingly, that limit places a limit on an amount of virtualization of the hardware performance registers 112 the processor 110*c* may perform.

In a particular example, the processor 110*c* may include hardware performance registers 112. In some embodiments, the hardware performance registers 112 may be used for analysis or debugging purposes. These hardware performance registers 112 may be implemented in hardware inside of the integrated circuit forming the processor 110*c*. As a result, the hardware performance registers 112 may have a reduced or negligible impact on other functionality of the processor 110*c*. For example, the processor 110*c* may include multiple hardware performance registers 112 to measure system activities without reduced or eliminated performance overhead including number of instructions per cycle, a frequency of operation, cache attributes such as L1, L2, or L3 cache/TLB hits/misses, memory stalls, transactions, or the like. Other examples of hardware performance registers 112 include a register to count memory related statistics such a memory local/remote reads/writes, bandwidth, or the like. Still other examples include temperature and power measurements of a processor, memory devices, or the like.

However, in some embodiments, the processor 110*c* may have a limited number of hardware performance registers 112. In addition, the hardware performance registers 112 may be implemented as 32-bit counters or other size-limited registers. A user may desire monitoring of hundreds or thousands of different activities of the processor 110*c* that may generate results that exceed the capacity of the hardware performance registers 112. Software running on the processor 110*c* may virtualize such hardware performance registers 112 to overcome such limited features. For example, the software may extend the performance monitoring/profiling capability of the hardware performance register to 64 bits in cooperation with the operating system. In a particular example, once any hardware performance register 112 overflows, then the operating system may handle the overflow while maintaining virtual 64-bit registers that reside in OS kernel memory spaces.

In some embodiments, by offloading the processing and memory needs associated with such uses of the hardware performance registers 112 to the SSD 100*c*, the overhead of the kernel running on the processor 110*c* may be reduced. For example, a reduced amount of the limited kernel memory may be used due to the data structures for the extension and/or virtualization of the hardware performance registers 112 being moved to the SSD 100*c*. In addition, a size of the code associated with processing the hardware performance registers 112 may also be reduced. As such data structures and code may be smaller, a potential impact on caches of the processor 110*c* may be reduced. That is, a smaller amount of code and data for other processes may be evicted from a cache due to the smaller code and data associated with processing the hardware performance registers 112.

In addition, the non-volatile memory 104*a* and the memory 104*b* of the SSD 100*c* may not have the restrictions imposed on the kernel memory of the processor 110*c*. As a result, a number of virtual performance registers 108 that may be created when virtualizing/multiplexing the hardware performance registers 112 may be greater. In particular, a size of memory available in the SSD 100*c* for the creation of virtual performance registers 108 may be larger than the available kernel memory in the processor 110*c*. Accordingly, more virtual performance registers 108 may be implemented in the larger memory of the SSD 100*c* than may be implemented in the restricted kernel memory.

In particular, the SSD 100*c* may have additional processing capabilities due to one or more processors 102. In some embodiments, these processors may be relatively power efficient as compared with a general purpose processor 110*c*. This additional capacity and efficiency of the SSD 100*c* may reduce a load on the processor 110*c* and reduce power consumption, improving the performance of the overall system.

Furthermore, the offloading of the monitoring to the SSD 100*c* may also improve the accuracy of the measurements. For example, if a hardware performance register 112 is configured to monitor cache status, loading the code and data structures associated with the monitoring into the cache may cause code and/or data of the process or virtual machine being monitored to be evicted from the cache where it would otherwise not have been evicted. By moving operations associated with the hardware performance register 112 to the SSD 100c, the chance of cache misses for the monitored process, virtual machine, container, or the like that are solely based on the monitoring itself may be reduced. In other words, an effect of the act of measurement itself on the result may be reduced, causing the measured result to be more accurate. Although measurements related to a cache has been used as an example of a measurement that may become more accurate by moving processing and data storage associated with the measurements to the SSD 100c, other measurements of other types of information may be similarly improved.

In addition to the monitoring, alarm functions may also be transferred to the SSD 100c. For example, processing related to alarms such as processor 110c usage, processor 110c temperature, memory temperature, virtual memory usage, physical memory usage, or the like may be performed by one or more of the processors 102 of the SSD 100c. That is, the non-volatile memory 104a or memory 104b may store thresholds or ranges for such alarms. One or more of the processors 102 may be configured to compare a value of a virtual performance register 108 to the thresholds or ranges and generate an alarm in response. If an alarm or other event is triggered, the SSD 100c may transmit that information to the processor 110c. In response, the processor 110c may communicate that information to an associated process, change its operation, or the like. Again, since at least a portion of the processing of alarms and/or events may be performed by the SSD 100c, the load on the processor 110c may be reduced.

While particular numbers of virtual performance registers 108, virtual machines, and events have been used as examples, any number may be present.

Figure 5:
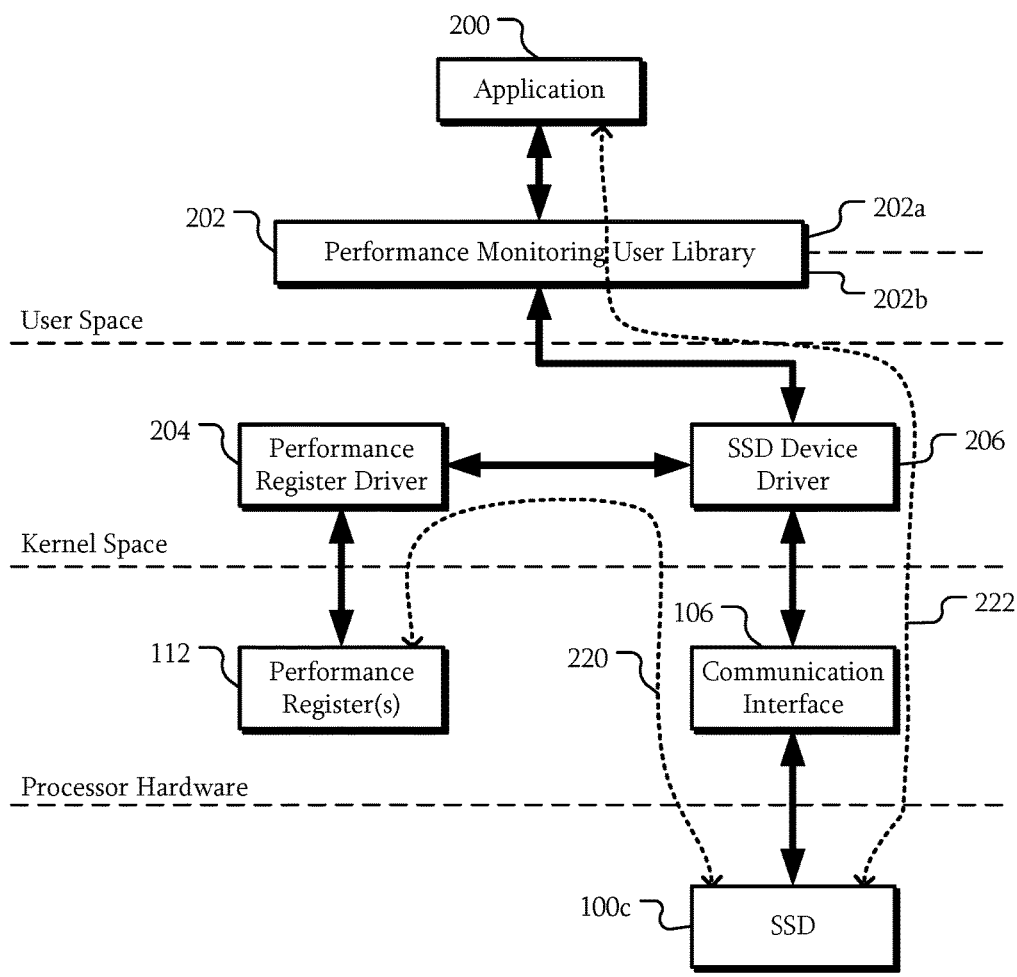
FIGS. 5-9 are schematic views of communication of performance register data and configurations according to some embodiments.

FIGS. 5-9 are schematic views of communication of performance register data and configurations according to some embodiments. The SSD 100c and processor 110c of FIG. 4 will be used as an example; however, the operations described herein may be applied to other systems described herein. Referring to FIGS. 4 and 5, in some embodiments, operations of the processor 110c may be divided according to privilege level. Processes in user space, such as an application 200 or a performance monitoring user library 202 may operate at a reduced privilege level. Other processes, such as performance register driver 204 and remote device driver 206 may operate at a higher privilege level in kernel space.

The performance register driver 204 is an example of code/data associated with accessing a hardware performance register 112. Here, a single hardware performance register 112 is illustrated; however, as described above, multiple hardware performance registers 112 may be present. Furthermore, although a single performance register driver 204 is illustrated, multiple performance register drivers 204 may be present corresponding to the different types of hardware performance registers 112.

The performance register driver 204 may be capable of reading, writing, and configuring the hardware performance register 112. While a unified hardware performance register 112 is used as an example, a data register such as a counter and a separate control register may be used to implement the functions described herein with respect to the hardware performance register 112. For example, when configuring a hardware performance register 112, the performance register driver 204 may write to such a separate control register.

The SSD device driver 206 is an example of code/data associated with accessing the SSD 100c. While a single SSD device driver 206 is illustrated, other modules may be present. For example, block device drivers, drivers for a particular communication interface 106, or the like may be present.

Two different accesses 220 and 222 are illustrated. Access 220 represents access to the hardware performance register 112 by the SSD 100c. Access 222 represents access to the SSD 100c by the application 200. As described above, the performance register driver 204 may be configured to access the hardware performance register 112. In addition, in some embodiments, the performance register driver 204 may also be configured to communicate with the SSD 100c through the SSD device driver 206. For example, performance data read from the hardware performance register 112 and/or configuration information may be communicated to the SSD 100c. Similarly, performance data to be written to the hardware performance register 112 and/or configuration information may be communicated from the SSD 100c to the hardware performance register 112. Due to access 220, the SSD 100c may be configured to maintain the virtual performance registers as described herein.

Access 222 represents accesses by an application 200 to the performance monitoring system presented by the SSD 100c. For example, the performance monitoring user library 202 may be configured to present an interface 202a to the application 200. Through interface 202a, the application 200 may manipulate the performance monitoring system, such as reading virtual performance registers 108, configuring such registers 108, setting alarm conditions, or the like. In some embodiments, the interface 202a may be similar to that presented by other libraries, such as libpfm; however, in other embodiments, the interface 202a may be different and/or include additional options. For example, the interface 202a may specify various commands to program, monitor, list, or otherwise access a unified performance monitoring system using the SSD 100c.

The interface 202b of the performance monitoring user library 202 may be directed towards the SSD device driver 206 rather than to a performance register driver 204. That is, because the SSD 100c may maintain the virtual performance registers 108 and may also be the unified interface for a performance monitoring system, accesses to the performance monitoring system may be performed through accesses to the SSD 100c. In some embodiments, the performance monitoring user library 202 may not be configured to access the hardware performance registers 112 or associated information and configurations without accessing the SSD 100c.

Figure 6:
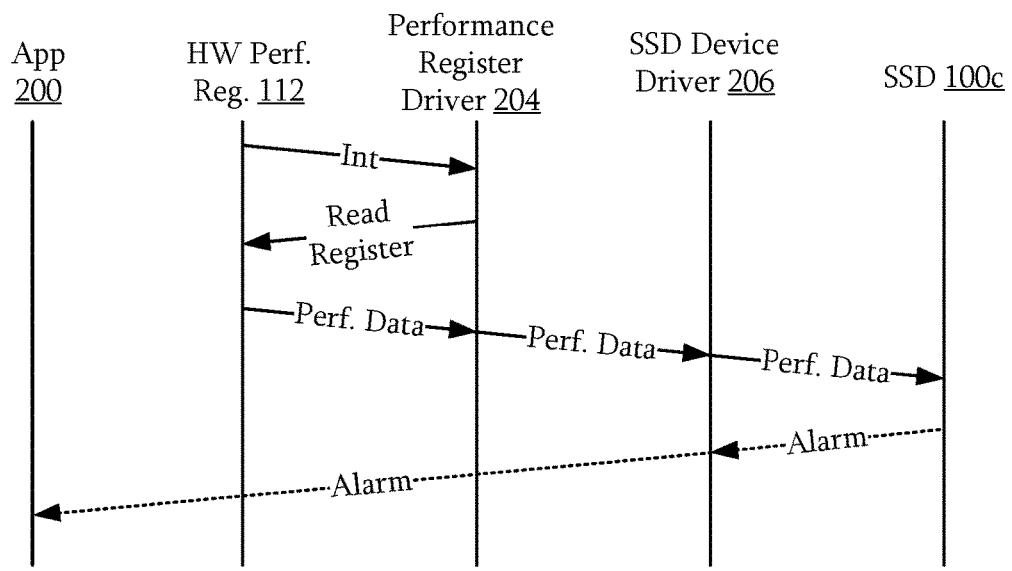

FIG. 6 illustrates an example of communication of performance data in response to an interrupt. FIGS. 4 and 5 will be used as examples. Referring to FIGS. 4-6, the hardware performance register 112 may generate an interrupt. For example, the hardware performance register 112 may reach or exceed a threshold, an overflow may occur, or another event may occur to generate the interrupt. The interrupt may be handled by an interrupt handler of the performance register driver 204. Although the hardware performance register 112 generating the interrupt has been used as an example, an interrupt may be generated in other ways. For example, a timer may generate an interrupt, another event may occur generating an interrupt, or the like.

The interrupt handler of the performance register driver 204 may be configured to read the hardware performance register 112 to receive performance data. Instead of updating a virtual performance register implemented on the processor 110c, the performance register driver 204 may be configured to transmit the performance data to the SSD 100c through the SSD device driver 206. Accordingly, in response to an interrupt from a hardware performance register 112, the SSD 100c may receive the performance data and process the data accordingly, such as by maintaining virtual performance register 108, triggering alarms, or the like.

In a particular example, if the performance data indicates that the hardware performance register 112 has overflowed. The SSD 100c may increment a least significant bit of a virtualized portion of the hardware performance register 112, i.e., the portion of the virtual performance register 108 that is greater than the size of the hardware performance register 112. The current value after overflow of the hardware performance register 112, which may or may not be zero, may be used to update the portion of the virtual performance register 108 corresponding to the hardware performance register 112. Accordingly, the virtual performance register 108 may maintain a state that the hardware performance register 112 would have been had the hardware performance register 112 had a larger size. Although one particular example of maintaining a virtual performance register 108 has been described above, other techniques may be used. The performance data retrieved from the hardware performance register 112 and the performance data transmitted to the SSD 100c may be changed accordingly to accommodate the different technique.

Here, an alarm is generated as an example other processing in the SSD 100c based on a virtual performance register 108. The SSD 100c transmits the alarm information to the application 200 through the SSD device driver 206.

Figure 7:
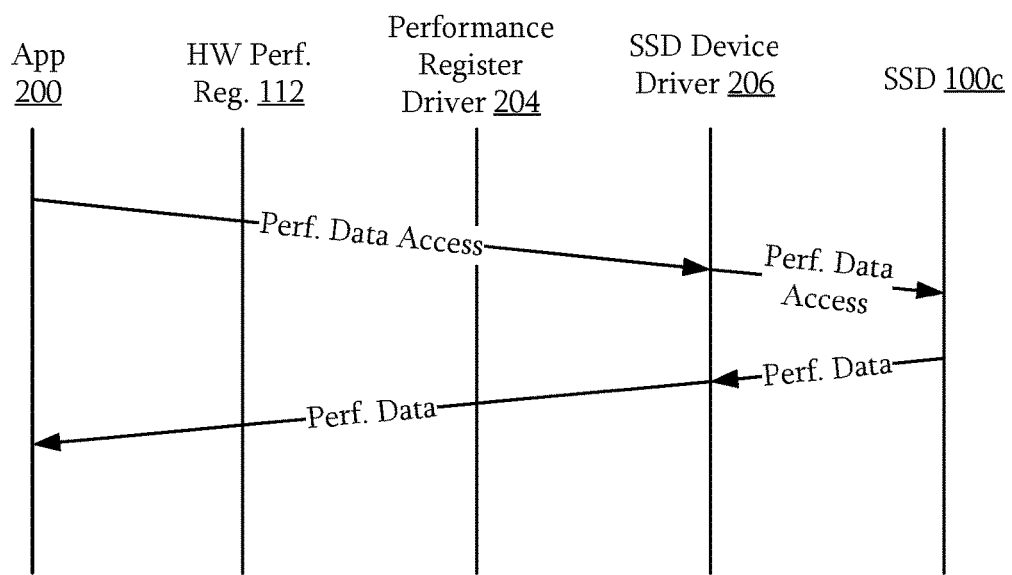

FIG. 7 illustrates an example of communication of performance data to an application. FIGS. 4 and 5 will be used as examples. Referring to FIGS. 4, 5, and 7, an application 200 may request performance data. In particular, the application 200 may request the performance data by accessing the SSD 100c. For example, the application 200 may transmit a performance data access using the SSD device driver 206 to the SSD 100c. In response the SSD 100c may access an associated virtual performance register 108 for performance data. The performance data may be transmitted to the application through the SSD device driver 206. Accordingly, the communication path may be represented by access 222 of FIG. 5.

Figure 8:
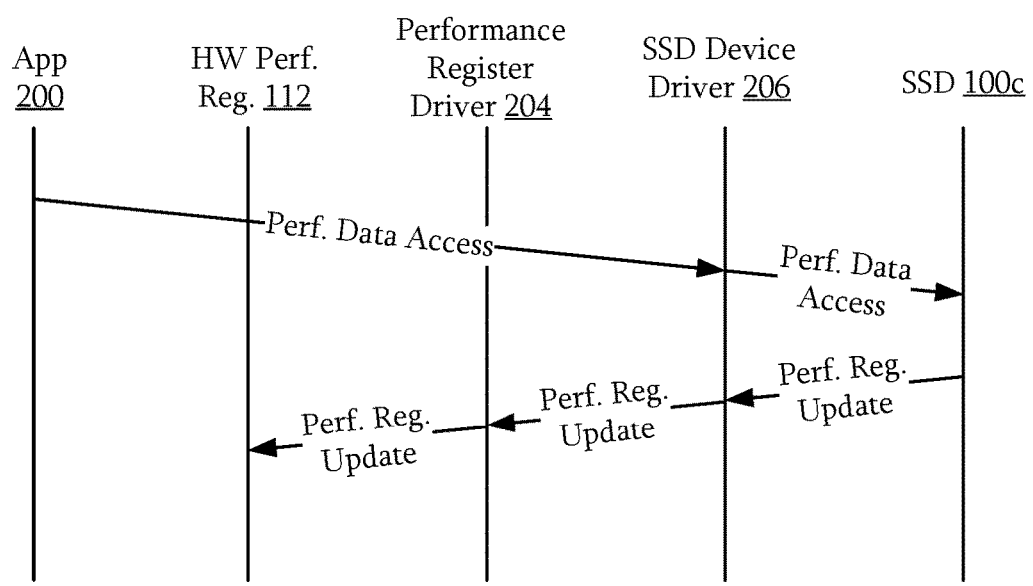

FIG. 8 illustrates an example of communication of configuration information according to some embodiments. FIGS. 4 and 5 will be used as examples. Referring to FIG. 8, the application 200 may reconfigure the performance monitoring system. For example, similar to the performance data access in FIG. 7, another performance data access may be transmitted from the application 200 to the SSD 100c through the SSD device driver 206. However, this performance data access includes performance register configuration information. In response, the SSD 100c may be configured to transmit a performance register configuration update to a corresponding hardware performance register 112 through the SSD device driver 206 and the performance register driver 204. That is, the performance register driver 204 may receive the performance register configuration update and reconfigure the operation of the hardware performance register 112. For example, the performance register driver 204 may set appropriate bits of a control register so that the hardware performance register 112 will begin to monitor for a different event.

Figure 9:
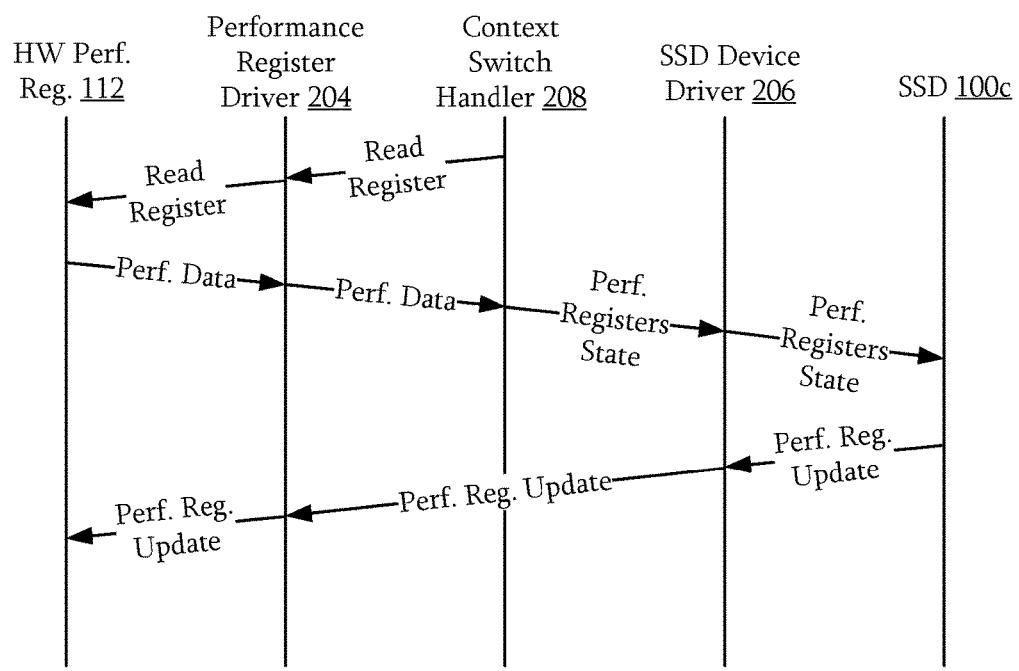

FIG. 9 illustrates an example of handling a context switch according to some embodiments. FIGS. 4 and 5 will be used as examples. Referring to FIGS. 4, 5, and 9, a context switch handler 208 may be configured to handle context switches, such as a context switch initiated in response to an interrupt. The context switch handler 208 may read various hardware performance registers 112 via the performance register driver 204. Although only one access to one hardware performance register 112 is illustrated, the context switch handler 208 may read from as many hardware performance registers 112 as needed to be able to restore the state. In addition, the context switch handler 208 may be configured to also read configuration information associated with the hardware performance register 112. Any information may be read that may be used to restore the state before the context switch may be read.

Once data from and information related to the hardware performance registers 112 is received, the context switch handler 208 may create a state of the hardware performance registers 112 and transmit that state to the SSD 100c. This communication or another communication may be a signal indicating to the SSD 100c that a context switch has occurred. The signal may also indicate the new context.

In response, the SSD 100c may be configured to update the corresponding virtual performance registers 108 of the old context. Thus, the SSD 100c may store a state of the performance data, including values and configuration information so that at a later time, the state may be restored. In addition, the SSD 100c may be configured to prepare an update for the performance registers corresponding to the new context. This update may include configuration information for the hardware performance registers 112, previous values of the hardware performance registers 112, or the like. In particular, the performance data may include data from different virtual performance registers 108 corresponding to the new context. Once the performance register update is received by the performance register driver 204, the performance register driver 204 may appropriately configure the hardware performance registers 112 and restore the hardware performance registers 112 to the previous state.

Although an application running on the processor 110c has been used as an example of an application that may access a performance monitoring system using the SSD 100c, other processes and/or applications, including those running on systems external to both the processor 110c and SSD 100c may access the performance monitoring system of the SSD 100c.

Although an SSD 100c has been used as an example, any storage device with internal processing and memory capabilities may perform the various functions described herein.

Figure 10:
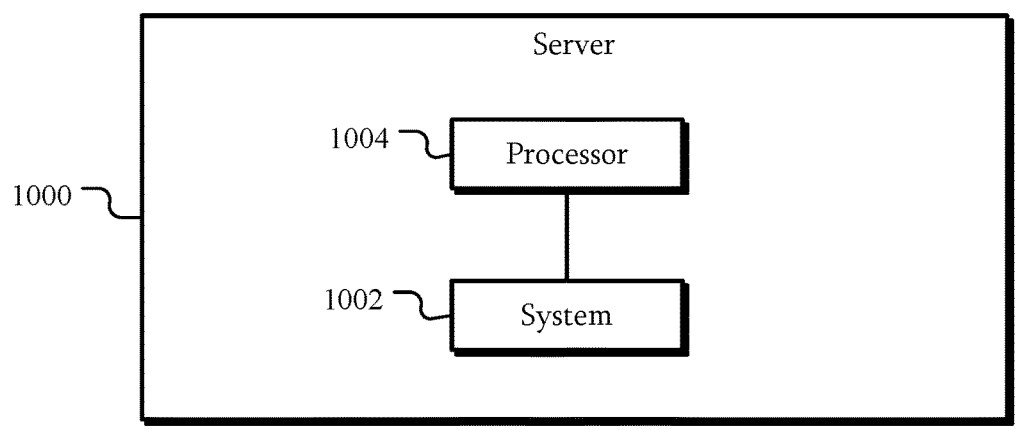
FIG. 10 is a schematic view of a server according to an embodiment.

FIG. 10 is a schematic view of a server according to an embodiment. In this embodiment, the server 1000 may include a stand-alone server, a rack-mounted server, a blade server, or the like. The server 1000 includes a system 1002 and a processor 1004. The processor 1004 is coupled to the system 1002. Although only one system 1002 is illustrated, any number of systems 1002 may be present. The system 1002 may be any of the above described corresponding systems such as the systems 100, 100a, and 100b, SSD 100c, or the like. In a particular embodiment, in addition to providing performance monitoring functions, an SSD 100c as the system 1002 may provide data storage for the server 1000.

Figure 11:
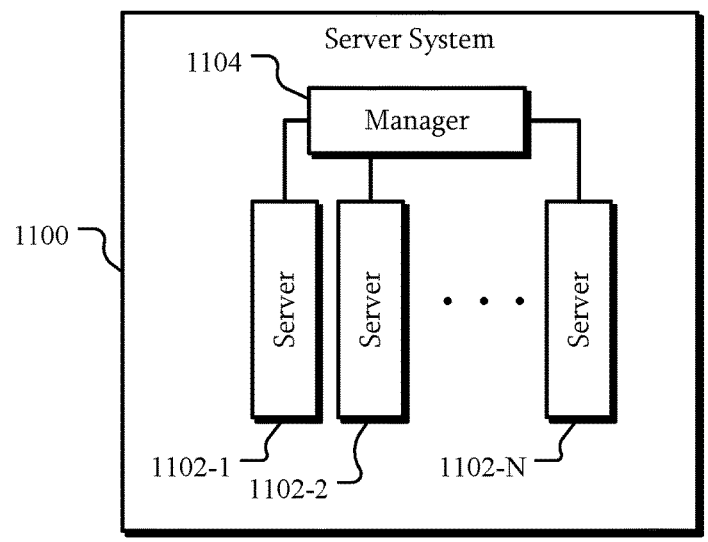
FIG. 11 is a schematic view of a server system according to an embodiment.

FIG. 11 is a schematic view of a server system according to an embodiment. In this embodiment, the server system 1100 includes multiple servers 1102-1 to 1102-N. The servers 1102 are each coupled to a manager 1104. One or more of the servers 1102 may be similar to the server 1000 described above.

The manager 1104 is configured to manage the servers 1102 and other components of the server system 1100. In an embodiment, the manager 1104 may be configured to monitor the performance of the servers 1102. For example, as each of the servers 1102 may include a system such as the systems 100, 100*a*, and 100*b*, SSD 100*c*, or the like described above, the manager 1104 may communicate with those systems to access performance data.

Figure 12:
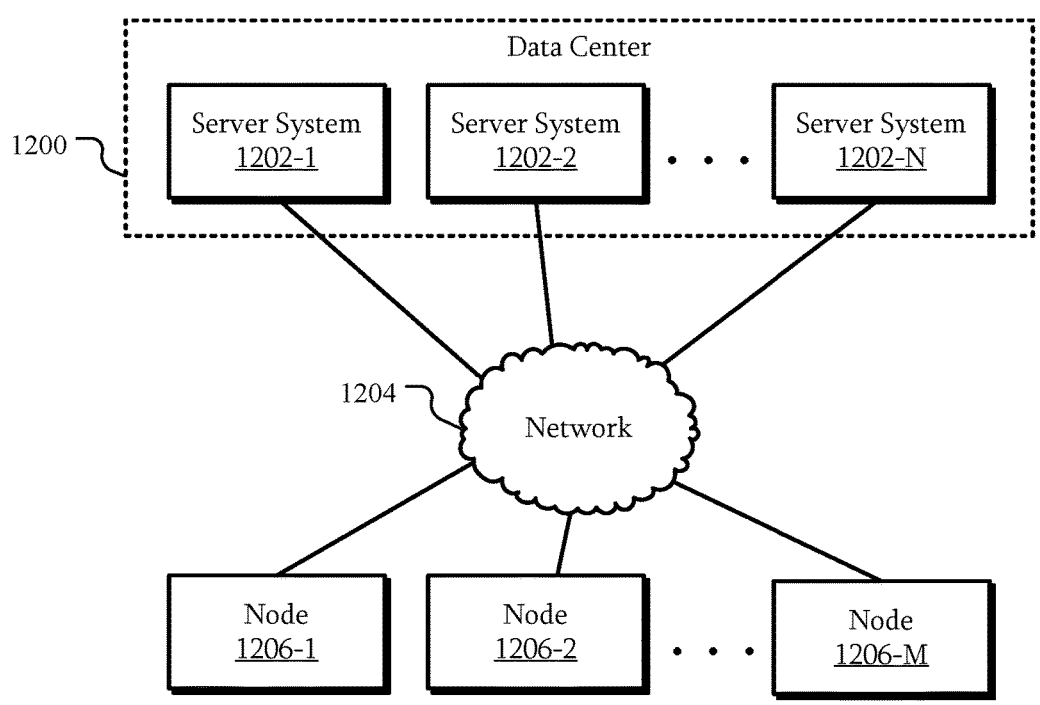
FIG. 12 is a schematic view of a data center according to an embodiment.

FIG. 12 is a schematic view of a data center according to an embodiment. In this embodiment, the data center 1200 includes multiple servers systems 1202-1 to 1202-N. The server systems 1202 may be similar to the server system 1100 described above in FIG. 11. The server systems 1202 are coupled to a network 1204, such as the Internet. Accordingly, the server systems 1202 may communicate through the network 1204 with various nodes 1206-1 to 1206-M. For example, the nodes 1206 may be client computers, other servers, remote data centers, storage systems, or the like.

Although the structures, methods, and systems have been described in accordance with particular embodiments, one of ordinary skill in the art will readily recognize that many variations to the disclosed embodiments are possible, and any variations should therefore be considered to be within the spirit and scope of the apparatus, method, and system disclosed herein. Accordingly, many modifications may be made by one of ordinary skill in the art without departing from the spirit and scope of the appended claims.

The invention claimed is:

1. A solid-state drive (SSD) system, comprising:
a communication interface configured to communicate with a remote system external to the system;
a memory; and
a processor coupled to the communication interface and the memory and configured to:
receive performance data from the remote system, through the communication interface, that has been received from a performance register of the remote system, the received performance data being a first type of performance data during a first set of periods of time and a second type of performance data during a second set of periods of time that alternates with the first set of periods of time, the first type of performance data being different from the second type of performance data;
maintain virtual performance registers in the memory for the received performance data, the virtual performance registers storing received performance data of the performance register of the remote system and allowing the remote system to use fewer resources for performance monitoring than if the remote system monitors performance using the performance register of the remote system;
interpolate between the received first type of performance data of two of the first sets of periods of time to generate first performance data during a third period of time of the second set of periods of time that intervenes between the two first periods of time;
store, in the virtual performance registers, a result of the interpolation for the third period of time;
receive a performance register access associated with the remote system through the communication interface; and
respond to the performance register access through the communication interface, the response being based on contents of the virtual performance register as stored for the first and second sets of periods of time or the third period of time.

2. The SSD system of claim 1, wherein the communication interface comprises a mass-storage device interface.

3. The SSD system of claim 1, wherein the communication interface comprises at least one of SATA, SAS, NVMe, Ethernet, FC, Infiniband, and RDMA.

4. The SSD system of claim 1, wherein the processor is further configured to receive a signal indicating a context switch of the remote system.

5. The SSD system of claim 4, wherein the processor is further configured to store a state of the performance data, in the virtual performance registers, in response to the signal indicating the context switch.

6. The SSD system of claim 4, wherein the processor is further configured to transmit performance data to the remote system, stored in the virtual performance registers, in response to the signal indicating the context switch.

7. The SSD system of claim 1, wherein:
the remote system is referred to as a first remote system;
the first type of performance data and the second type of performance are referred to a first remote-system performance data;
the virtual performance registers storing the first type of performance data and the second type of performance data are referred to as a first remote-system virtual performance registers; and
the processor is further configured to:
receive second remote-system performance data from a second remote system, through the communication interface that has been received from a performance register of the second remote system;
maintain a second remote-system virtual performance register in the memory for the second remote-system performance data, the second remote-system virtual performance register corresponding to the performance register of the second remote system and allowing the second remote system to use fewer resources for performance monitoring than if the second remote system monitors performance using the performance register of the second remote system;
receive a performance register access associated with the second remote system through the communication interface; and
respond to performance register accesses associated with the second remote system through the communication interface, the response being based on contents of the second remote-system virtual performance register.

8. The SSD system of claim 1, wherein the processor is further configured to transmit performance register configuration information to the remote system, the performance register configuration information indicating a configuration of the performance register associated with the received performance data.

9. The SSD system of claim 1, wherein the processor is further configured monitor the virtual performance registers and transmit an alarm to the remote system based on the virtual performance registers.

10. A method, comprising:
receiving, by a processor in a solid-state drive (SSD) system, performance data, through a communication interface of the SSD, from a remote system external to the SSD, the performance data being received from a performance register of the remote system, the received performance data being a first type of performance data during a first set of periods of time and second type of performance data during a second set of periods of time that alternates with the first set of periods of time, the first type of performance data being different from the second type of performance data;

maintaining, by the processor, virtual performance registers in a memory of the SSD for storing received performance data and allowing the remote system to use fewer resources for performance monitoring than if the remote system monitors performance using the performance register of the remote system;

interpolating between the received first type of performance data of two of the first sets of periods of time to generate first performance data during a third period of time of the second set of periods of time that intervenes between the two first periods of time;

storing, in the virtual performance registers, a result of the interpolation for the third period of time;

receiving, by the processor, a performance register access associated with the remote system through the communication interface; and responding, by the processor, to the performance register access through the communication interface, the response being based on contents of the virtual performance register as stored for the first and second sets of periods of time or the third period of time.

11. The method of claim 10, further comprising receiving, by the processor, a signal indicating a context switch of the remote system.

12. The method of claim 11, wherein the processor is further configured to store a state of the performance data in the virtual performance registers in response to the signal indicating the context switch.

13. The method of claim 11, wherein the processor is further configured to transmit performance data to the remote system from the virtual performance registers in response to the signal indicating the context switch.

14. The method of claim 10, wherein the processor is further configured to transmit performance register configuration information to the remote system, the performance register configuration information indicating a configuration of a performance register of the remote system associated with the performance data.

15. The method of claim 10, wherein:

the remote system is referred to as a first remote system;

the first type of performance data and the second type of performance data are referred to a first remote-system performance data;

the virtual performance registers storing the first type of performance data and the second type of performance data are referred to as a first remote-system virtual performance register; and the processor is further configured to:

receive second remote-system performance data from a second remote system through the communication interface that has been received from a performance register of the second remote system;

maintain a second remote-system virtual performance register in the memory for the second remote-system performance data, the second remote-system virtual performance register corresponding to the performance register of the second remote system and allowing the second remote system to use fewer resources for performance monitoring than if the second remote system monitors performance using the performance register of the second remote system;

receive a performance register access associated with the second remote system through the communication interface; and respond to performance register accesses associated with the second remote system through the communication interface based on the second remote-system virtual performance register.

* * * * *